United States Patent [19]

Stewart

[11] 4,232,580
[45] Nov. 11, 1980

[54] CIRCULAR SAW BLADE

[76] Inventor: John S. Stewart, P.O. Box 5670, Greensboro, N.C. 27403

[21] Appl. No.: 957,859

[22] Filed: Nov. 6, 1978

[51] Int. Cl.³ .................................................. B27B 33/08
[52] U.S. Cl. ........................................... 83/835; 83/676
[58] Field of Search ............................. 83/835, 676, 666

[56] References Cited

U.S. PATENT DOCUMENTS

| | | | |
|---|---|---|---|
| 334,440 | 1/1886 | Ireland | 83/835 |
| 384,979 | 6/1888 | Hurd | 83/835 |
| 635,509 | 10/1899 | Rowe et al. | 83/835 |
| 940,420 | 11/1909 | Ayers et al. | 83/676 |
| 3,306,149 | 2/1967 | John | 83/676 |
| 3,363,617 | 1/1968 | Hoerer | 83/835 X |
| 3,730,038 | 5/1973 | Farb | 83/835 X |
| 3,799,025 | 3/1974 | Tsunoda | 83/835 |
| 4,034,639 | 7/1977 | Caldwell | 83/835 |
| 4,106,382 | 8/1978 | Salje et al. | 83/835 |

FOREIGN PATENT DOCUMENTS

184359  8/1936  Switzerland ............................. 83/835

*Primary Examiner*—Frank T. Yost

[57] ABSTRACT

A circular saw blade having reduced vibration through increased damping by utilization of radial slots in the blade to form blade segments to interrupt circumferential vibration in the blade which may have blade segment stiffening means and having a damping collar axially aligned with said blade to provide a sink for dissipation of vibrational energy from the blade segments.

7 Claims, 3 Drawing Figures

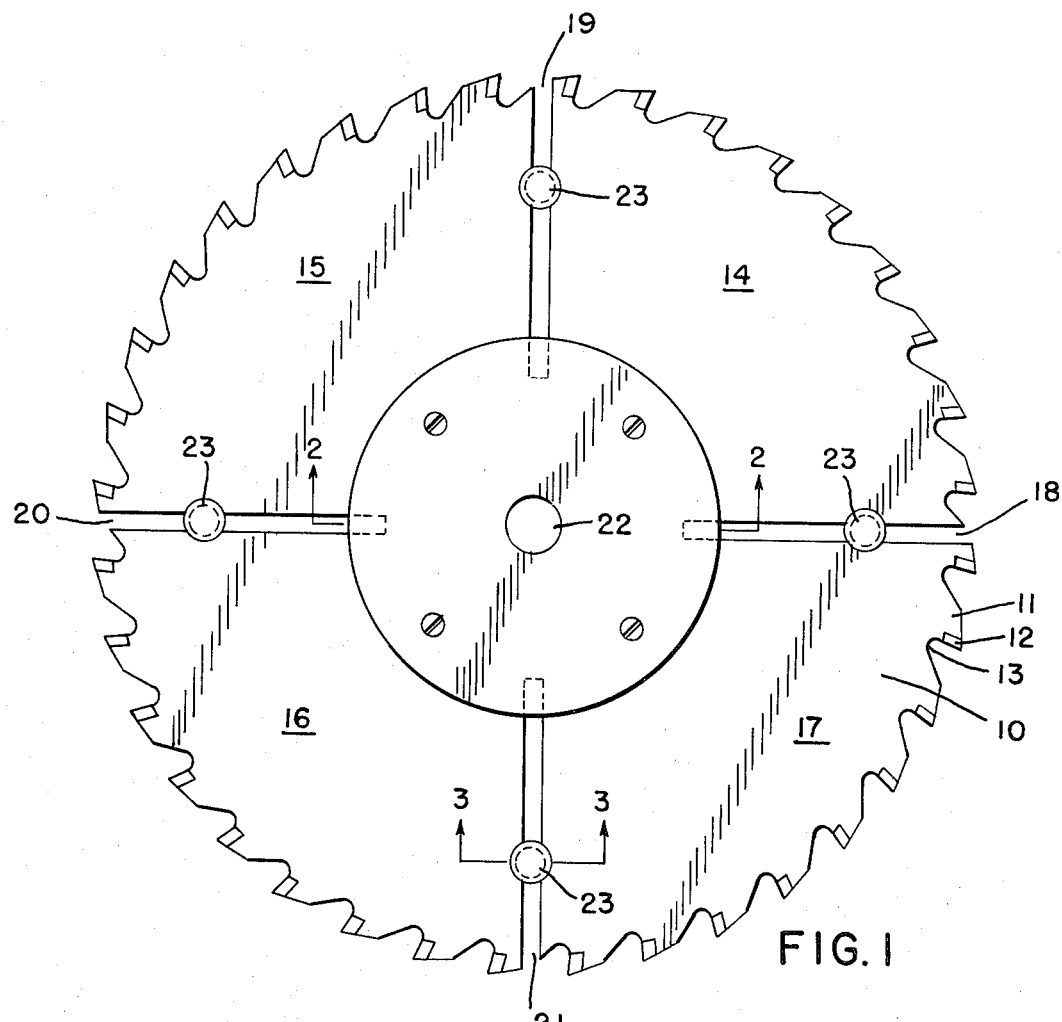
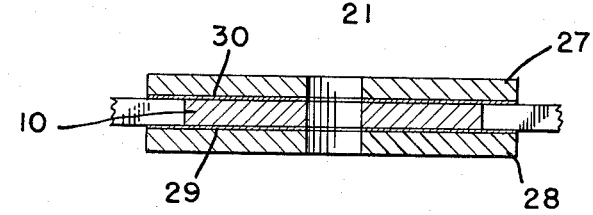
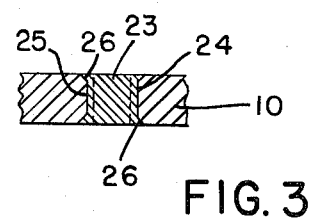

CIRCULAR SAW BLADE

BACKGROUND AND OBJECTIVES OF THE INVENTION

Circular saw blades exhibit three types of vibration: a resonant vibration at a particular frequency usually during idling known as the "screaming" blade; a resonant response at many frequencies during cutting; and a forced vibration as opposed to resonant vibration which occurs at the tooth passage frequency and multiples of that frequency. A key to solving the first two problems is to increase damping but the solution is not usually adequate for the third vibration, since forced vibration is not as sensitive to damping as are free resonant vibrations.

The vibration response of circular saw blades may involve both diametrical and circumferential travelling waves. This modal response is usually excited near the periphery by aerodynamic disturbances or the actual cutting process. It is known that contributions to the radiated sound are greatest for circumferential travelling waves near the periphery where vibrational amplitudes are large and the structural wave length is large compared to the acoustic wave length. Noise sources in the vicinity of the cutting tool are usually aerodynamic or blade vibration in nature and the reduction of sound radiation through the use of shields, partial or total enclosures, have been utilized. Other approaches have been made to reduce tool sound radiation for circular saws which involve alteration of the saw blade itself by increasing the blade damping. The disclosure in U.S. Pat. No. 3,107,706 presents inclined slots which are circumferentially spaced about the periphery of the saw blade with inserts installed in the slots in the form of slugs in spaced relation to the saw periphery. Other disclosures for modifying vibration are set forth in U.S. Pat. Nos. 3,563,286; 3,812,755; and 4,034,638. In addition, inclined slots that do not extend to the periphery of the blade with collars that do not extend to the slots have been introduced by Industrial Carbide Saw and Tool Corp. of Louisville, Kentucky, and is the subject of a publication entitled: *Noise Reduction Achieved With Slotted Blades* by Michael S. Bobeczko and B. B. Henry which discloses the saw blade of Industrial Carbide Saw and Tool Corp.

It can be shown that reduction of saw blade vibration response can be achieved through increased damping (see Appendix A). This may be achieved in a number of ways such as by interrupting wave propagation due to circumferentially travelling waves and by providing an appropriately designed energy-absorbing termination in the form of a collar which may dissipate the propagated energy and by radial slots in the circular saw blade that are circumferentially spaced. The blade segments may, if desirable, be stiffened by ribs in the radial slots that will transmit little vibrational energy.

Wave motion is effectively impeded in the circumferential direction by the radial slot. The stiffening ribs, if utilized, are preferably of a design that will be capable of transmitting little vibrational energy due to the large change in cross-sectional area and/or material properties. The stored vibrational energy in each section of the saw blade will take the path of least resistance which would result in energy flow inward into the damping collars where dissipation occurs due to shear stresses in the damping layer. The damping collars are not rigid with respect to high frequency vibration and provide a sink for energy dissipation rather than a reflective termination. By reducing the tendency for circumferential waves to form around the blade, the waves do not reinforce but terminate within a closed system.

It is, therefore, an objective of this invention to provide a circular saw blade with means for altering wave propagation and to absorb the vibrational energy in damping means centrally located where dissipation may occur due to shear stresses.

Another objective of this invention is to provide a circular saw blade with radially-extending slots which may have means in the slots for increased structural integrity to the formed blade segments and a damping member that is centrally located for receiving vibrational energy.

Other objectives and many of the attendant advantages of this invention will become more readily apparent to those skilled in the art of noise control and vibration in tools from the following detailed description of the invention and the claims in which equivalents are contemplated.

DESCRIPTION OF THE DRAWING

FIG. 1 is a side elevational view of a circular saw blade embodying the invention;

FIG. 2 is a partial transverse sectional view taken along line 2—2 of FIG. 1; and FIG. 3 is a slightly enlarged partial sectional view taken along line 3—3 of FIG. 1.

DESCRIPTION OF PREFERRED EMBODIMENT OF INVENTION

Referring to the drawing and particularly to FIG. 1, there is shown a circular saw blade 10 having a plurality of circumferentially-spaced tooth blanks 11 to each of which is secured a carbide or tool steel cutting tooth or the blank may be ground to form a cutting tooth 12 adjacent to the tooth gullet 13.

Circular saw blade 10 is divided into four quadrants or segments 14–17 that are formed by the radially projecting slots 18–21 which extend inwardly from the periphery of the blade which terminate at a radius that is less than half of the radius of the blade and spaced from the mounting central hole 22 without impairing the structural integrity of the blade. A reinforcing or stiffening rib 23 may be mounted securely in each of the radial slots and is preferably a brass or steel rivet or a plug of other metal different from that which the blade 10 is made or of a suitable plastic material. The stiffening ribs or rivets 23 mounted in the slots 18–21 help restrain the blade segments 14–17 from transverse displacement and also transmit little vibrational energy due to the large change in cross-sectional area and the properties of the plug or rivet. Preferably the stiffening ribs 23 are positioned a distance equal to approximately one-fourth of the blade radius from the outer periphery of the blade.

Preferably in industrial saw blades reinforcing ribs 23, shown in FIG. 3, may be used and are shown seated in arcuate openings 24 and 25 in adjacent blade segments, which arcuate openings are provided which chamfered or countersunk edges 26 to receive the upset rivet 23 therein with the opposite ends of the rivet being preferably flush with the opposite surfaces of the blade 10. The ribs 23 span the radially projecting slots 18–21 to maintain the structural integrity of the blade. However, for small tools the ribs 23 may be omitted unless increased structural integrity is necessary.

Collars 27 and 28 of steel or other suitable material may be centrally positioned about the blade mounting hole 22 on opposite faces of the blade 10 and extend outward radially to cover at least a portion of the radial slots 18–21, as shown in FIG. 1. Of added damping value are the thin circular plastic pads 29 and 30, preferably made of a plastic material, and are adhered to the circular collars 27 and 28 to abut against opposite surfaces of the blade 10 to form a damping collar which will provide a sink for dissipation of vibrational energy transmitted by the saw blade segments. The vibrational energy in each of the blade segments will take the path of least resistance and flow into the damping collars where dissipation occurs due to sheer stresses set up in the various damping layers of collar members. Although the use of plastic pads 29 and 30 is more desirable for damping with the damping collars 27 and 28, the metal damping collars 27 and 28 may be used effectively without the plastic pads 29 and 30. (In some cases the use of slots alone, without ribs or collars, is effective in damping.)

By the structure of the saw blade 10 of this concept, an impedance mismatch between adjacent sections or segments will occur and thereby reduce resonant vibration and resonant response while also having a beneficial effect upon forced vibration. Isolation of the blade segment will inhibit circumferential vibration. The isolated blade segments reduce coupling of the waves enabling each of the blade segments to approximate a closed system with vibration being damped by the collar members. By means of the structure described, the circumferential wave motion is restricted and a sink formed by the collars for absorbing vibrational energy is provided.

APPENDEX A

Mathematically the sound radiated by a vibrating structure in the steady state can be expressed under certain restrictions as:

$$P = \rho C A \sigma (\overline{V^2}) \quad (1)$$

P = acoustic power
$\rho C$ = characteristic impedance of air
A = radiating surface area
$\sigma$ = radiation efficiency (real part of radiation impedance)
$(\overline{V^2})$ = averaged surface velocity The average velocity in a particular vibration mode can be expressed by $$(\overline{V^2}) = \frac{\omega^2 F^2}{A^2 \rho_m^2 t^2} \left( \frac{1}{(\omega_n^2 - \omega^2)^2 + \eta^2 \omega^4} \right) \quad (2)$$

where
$\omega$ = exciting frequency
$\omega n$ = natural frequency(s)
F = exciting force
A = surface area
$\rho m$ = density of structure
t = thickness of structure
$\eta$ = damping factor Examining equation (1) for a particular structure, it is noted that sound output may be reduced by reducing $\sigma$ or $(\overline{V^2})$. Reduction in $\sigma$, the radiation efficiency, requires alteration of mass and stiffness characteristics of the structure, which is not considered herein. Reduction of $(\overline{V^2})$, may be accomplished by reduced force (F), increased area and density, and alterations in the difference $(\omega_n^2 - \omega^2)$. Since the latter quantity involves $\omega_n$ (the resonant frequencies of which the structure has an infinite number) it is clear that when $\omega = \omega_n$, the damping $(\eta)$ limits the velocity response. Thus, for resonant blade vibrations $(\omega = \omega_n)$, increased damping controls response and is of obvious benefit from a sound reduction standpoint.

I claim:

1. A circular saw blade comprising a circular disk having opposite flat faces and a plurality of circumferentially spaced cutting teeth, said blade having a plurality of circumferentially-spaced and radial slots extending in said blade to a depth at least half the radius of said blade forming blade segments, and collar means for central clamping against at least one flat face of said disk and partially overlapping said slot whereby vibrational energy is damped.

2. A circular saw blade as claimed in claim 1, and rib stiffening means mounted between segments in said radial slots.

3. A circular saw blade as claimed in claim 1, said collar means having a plastic disk thereon for engaging at least one flat face of the circular disk.

4. A circular saw blade as claimed in claim 1, said collar means engaging opposite flat faces of said circular disk.

5. A circular saw blade as claimed in claim 1, said collar means having plastic disks engaging opposite flat faces of said circular disk.

6. A circular saw blade as claimed in claim 1, and rib stiffening means mounted between blade segments in said slots being a rivet, said rivet being made of solid material.

7. A circular saw blade as claimed in claim 1, said collar means engaging opposite flat faces of said circular disk, said collar means having plastic disks thereon to engage said flat faces of said circular disks, said rib stiffening means mounted between said blade segments in said slots at a location substantially one-fourth of the radius length from the circumferentially spaced cutting teeth.

* * * * *